United States Patent
Klein et al.

(10) Patent No.: US 11,017,022 B2
(45) Date of Patent: May 25, 2021

(54) METHOD AND SYSTEM FOR PROVIDING AUDIO CONTENT

(71) Applicant: SubPLY Solutions Ltd., Tel-Aviv (IL)

(72) Inventors: Gal Klein, Rishon-LeZion (IL); Rachel Ludmer, Kfar-Gibton (IL)

(73) Assignee: SubPLY Solutions Ltd., Tel-Aviv (IL)

( * ) Notice: Subject to any disclaimer, the term of this patent is extended or adjusted under 35 U.S.C. 154(b) by 366 days.

(21) Appl. No.: 15/508,120

(22) PCT Filed: Jan. 29, 2017

(86) PCT No.: PCT/IL2017/050104
§ 371 (c)(1),
(2) Date: Mar. 2, 2017

(87) PCT Pub. No.: WO2017/130201
PCT Pub. Date: Aug. 3, 2017

(65) Prior Publication Data
US 2018/0052920 A1   Feb. 22, 2018

Related U.S. Application Data

(60) Provisional application No. 62/287,924, filed on Jan. 28, 2016.

(51) Int. Cl.
*G06F 16/60* (2019.01)
*G06F 16/683* (2019.01)
(Continued)

(52) U.S. Cl.
CPC .......... *G06F 16/685* (2019.01); *G06F 16/433* (2019.01); *G06F 16/632* (2019.01); *G10L 17/18* (2013.01); *H04L 67/02* (2013.01)

(58) Field of Classification Search
CPC .... G06F 16/433; G06F 16/685; G06F 16/332; G06F 16/632; G10L 15/22; G10L 15/26; G10L 17/18; H04L 67/02
See application file for complete search history.

(56) References Cited

U.S. PATENT DOCUMENTS 6,434,520 B1 *   8/2002   Kanevsky ............... G10L 15/26
                                                        704/243
6,636,238 B1 * 10/2003   Amir ..................... G06F 16/685
                                                        715/730

(Continued)

FOREIGN PATENT DOCUMENTS

| EP | 1016985 | 7/2000 |
|---|---|---|
| IL | 230277 | 7/2015 |
| WO | WO 2017/130201 | 8/2017 |

OTHER PUBLICATIONS

"Advances in Domain Independant Linear Text Segmentation"—Freddy Y. Y. Choi—Artificial Intelligence Group—Department of Computer Science—University of Manchester—Mar. 30, 2000.

(Continued)

*Primary Examiner* — Merilyn P Nguyen

(57) ABSTRACT

Methods and systems are disclosed in which audio broadcasts are converted into audio segments, for example, based on segment content. These audio segments are indexed, so as to be searchable, as computer searchable segments, for example, by network search engines and other computerized search tools.

18 Claims, 9 Drawing Sheets

(51) Int. Cl.
    *G06F 16/432*     (2019.01)
    *G06F 16/632*     (2019.01)
    *G10L 17/18*     (2013.01)
    *H04L 29/08*     (2006.01)

(56) References Cited

U.S. PATENT DOCUMENTS

| | | | |
|---|---|---|---|
| 6,990,496 B1* | 1/2006 | McGee, III | G06K 9/62 |
| 8,422,787 B2* | 4/2013 | Terao | G06F 16/345 |
| | | | 382/177 |
| 8,707,381 B2* | 4/2014 | Polumbus | G10L 15/22 |
| | | | 725/131 |
| 8,756,233 B2* | 6/2014 | AbdAlmageed | G06F 16/7844 |
| | | | 707/738 |
| 8,872,979 B2* | 10/2014 | Bagga | H04N 21/4394 |
| | | | 348/700 |
| 2004/0252977 A1* | 12/2004 | Batrouny | H04N 21/235 |
| | | | 386/240 |
| 2009/0210226 A1* | 8/2009 | Ma | G10L 15/26 |
| | | | 704/236 |
| 2010/0049500 A1* | 2/2010 | Kobayashi | G10L 15/193 |
| | | | 704/9 |
| 2011/0043652 A1* | 2/2011 | King | G06F 40/194 |
| | | | 348/222.1 |
| 2012/0084435 A1* | 4/2012 | Vasa | G06F 16/7844 |
| | | | 709/224 |
| 2014/0325335 A1* | 10/2014 | Paulik | G06F 16/685 |
| | | | 715/234 |
| 2015/0199968 A1* | 7/2015 | Singhal | G01C 21/3629 |
| | | | 704/251 |
| 2017/0039045 A1* | 2/2017 | Abrahami | A61P 25/18 |

OTHER PUBLICATIONS

International Preliminary Report on Patentability dated Aug. 9, 2018 From the International Bureau of WIPO Re. Application No. PCT/IL2017/050104. (7 Pages).

International Search Report and the Written Opinion dated Apr. 27, 2017 From the International Searching Authority Re. Application No. PCT/IL2017/050104. (9 Pages).

* cited by examiner

| TOPIC | SCORE | | | | | |
|---|---|---|---|---|---|---|
| | Window 1 (511) | Window 2 (512) | Window 3 (513) | Window 4 (514) | Window 5 (515) | Window n |
| TOPIC 1 | 0 | 0 | 0 | 0 | 0 | |
| TOPIC 2 | 1 | 1 | 0 | 0 | 0 | |
| TOPIC 3 | 3 | 2 | 1 | 0 | 0 | |
| TOPIC 4 | 1 | 2 | 3 | 3 | 2 | |

| TOPIC/Probability (p) | p1 (Total) | p2 (Total) | p3 (Total) |
|---|---|---|---|
| TOPIC 1 | 0.5 | 0 | 0 |
| TOPIC 2 | 0 | 0 | 0 |
| TOPIC 3 - Sports | 0.5 | 0.4 | 0.0 |
| TOPIC 4 | 0 | 0 | 0 |
| TOPIC 5 - Politics | 0 | 0.6 | 1.0 |

| Similarity Score | Window 1 561 | Window 2 562 | Window 3 563 | Window 4 564 | Window n |
|---|---|---|---|---|---|
| Window 1 561 |  | 5 | 1 | 2 |  |
| Window 2 562 |  |  | 1 | 1 |  |
| Window 3 563 |  |  |  | 4 |  |
| Window 4 564 |  |  |  |  |  |
| Window n |  |  |  |  |  |

METHOD AND SYSTEM FOR PROVIDING AUDIO CONTENT

TECHNICAL FIELD

The present invention relates to methods and systems for providing audio content in accordance with requests therefor.

BACKGROUND

Audio broadcasts are commonplace, from both regular AM and FM band Radio, as well as satellite Radio, such as SiriusXM® Satellite Radio, and radio stations which use the Internet for broadcasting. While some content is recorded and archived, it is typically not accessible to the public, and if it is, it is not easily found.

SUMMARY OF THE DISCLOSED SUBJECT MATTER

The present invention includes embodiments that are directed to methods and systems which allow audio broadcasts to be converted, for example, in real time, into audio segments which are indexed, so as to be searchable, using network search engines and other computerized search tools.

Other embodiments of the invention are directed to methods and systems in which audio broadcasts are converted into audio segments, for example, based on segment (e.g., audio segment) content. These audio segments are indexed, tagged, and other associated with other indexing items, so as to be searchable, as computer searchable segments, for example, by network search engines and other computerized search tools.

Other embodiments of the invention are directed to methods, which are computer-implemented by processors, computers, computer and computerized components, and the like, and systems (of processors, computers, computer and computerized components, and the like) for obtaining an audio stream, for example, from a broadcast media stream. The audio stream is converted to text, for example, by an automatic speech recognition (ASR) module or other speech recognition software hardware or combinations thereof. The text is segmented, for example, automatically, into segments, in accordance with predefined units. These predefined units are, for example, based on content, as segmented in accordance with one or more of separation points (transition or segmentation points) and other indicators (e.g., one or more thereof) for segmentation and separation. Each text segment is correlated with a corresponding audio portion from the audio stream, defining audio segments from the audio stream. The content for the predefined units is, for example, topics, advertisements, public service announcements, and other broadcast portions. The other indicators for separation of the segments include, for example, rules and policies, changes in the relatedness of words based on their meaning in a portion of the text, keywords, word markers, audio cues, and scores for relatedness between words in a portion of the text. The broadcast media stream is from broadcasts, such as, radio broadcasts, television broadcasts, Internet broadcasts including, podcasts, and network carried broadcasts, cable and satellite broadcasts. The aforementioned method may be performed in real time. Each audio segment is typically enriched with (or associated with) tags, images, metadata and/or other indexing items, so that each audio segment is a computer searchable audio segment. Additionally, each audio segment is storable (e.g., individually or as in a plurality of audio segments) in storage media, or as metadata with the actual data for the audio segment in cloud storage.

Embodiments of the invention are directed to a computer-implemented method for providing audio content in segments. The method comprises: obtaining an audio stream, for example, from a broadcast; converting the audio stream to text; separating the text into text segments based on at least one indicator; and, correlating each text segment with a corresponding portion of the audio from the audio stream, the corresponding portion of the audio defining an audio segment.

Optionally, the computer-implemented method additionally comprises enriching each audio segment such that each audio segment is a computer searchable audio segment.

Optionally, the computer-implemented method is performed automatically by at least one processor.

Optionally, the at least one indicator is selected from at least one of: rules and policies, changes in the relatedness of words based on their meaning in a portion of the text, keywords, word markers, audio cues, and scores for relatedness between words in a portion of the text.

Optionally, the at least one indicator includes a plurality of indicators.

Optionally, the audio segments include segments of audio content based on at least one of topics, advertisements, and public service announcements.

Optionally, the audio stream is from a broadcast. The broadcast is, for example, one of a radio broadcast, a television broadcast, a cable broadcast, a webcast, a podcast, and a network carried broadcast.

Optionally the converting the audio stream to text is performed by at least one of automatic speech recognition software, hardware or combinations thereof.

Another embodiment of the invention is directed to a system for providing audio content in segments. The system comprises: a computerized processing unit; and, storage media for storing computer components for in communication with the computerized processing unit. The computer components comprise: a first component for obtaining an audio stream; a second component for converting the audio stream to text; a third component for automatically separating the text into segments based on at least one indicator; and, a fourth component for correlating each text segment with a corresponding portion of the audio from the audio stream, the corresponding portion of the audio defining an audio segment.

Optionally, the system additionally comprises: a fifth component for enriching each audio segment such that each audio segment is a computer searchable audio segment.

Optionally, the first component is configured for obtaining the audio stream from a broadcast, the broadcast selected from the group consisting of a radio broadcast, a television broadcast, a podcast, a network carried broadcast.

Optionally, the third component separates the text into segments based on at least one indicator, the at least one indicator being applied to produce content based audio segments.

Optionally, the content based audio segments include topics, and the third component selects topics by analyzing electronic documents including web pages.

Optionally, the computerized processing unit includes a central processing unit and a graphics processing unit.

Optionally, the second component for converting the audio stream to text is performed by an automatic speech recognition (ASR) module which executes on the graphics processing unit.

Another embodiment is directed to a system for providing audio content in segments, for example, audio segments. The system comprises: a computerized processing unit, programmed to: obtain an audio stream; and, correlate text segments with the corresponding audio from the audio stream to produce audio segments; a converter for converting the speech of the audio stream into text output, the converter in communication with the computerized processing unit; and, a segmenter for automatically separating the text output into segments based on at least one indicator.

Optionally, the converter includes an automatic speech recognition (ASR) module.

Optionally, the computerized processing unit includes a central processing unit and a graphics processing unit and the ASR module executes on the graphics processing unit.

Optionally, the segments of text output and the corresponding audio segments are content based.

Optionally, the computerized processing unit is additionally programmed to: enrich each audio segment by associating at least one of metadata, tags, images, and indexing items, with said each audio segment, such that said each audio segment is a computer searchable audio segment.

This document references terms that are used consistently or interchangeably herein. These terms, including variations thereof, are as follows.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over Networks including the Internet.

"n" and "n$^{th}$" in the description below and the drawing figures represents the last member of a series or sequence of members, such as elements, servers, databases, caches, components, listings, links, data files, etc.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 3C-1 is a diagram showing a sliding window for text analysis;

FIG. 3C-2 is a table assigning values to the windows of FIG. 3C-1;

FIG. 3C-3 is a diagram showing a transition between topics:

FIG. 3C-4 is a table illustrating hybrid topics;

FIG. 3C-5 is a diagram of hybrid topics;

FIG. 3C-6 is a diagram showing successive windows for text analysis;

FIG. 3C-7 is a table assigning values to the windows of FIG. 3C-6; and,

FIG. 4 is a flow diagram of an exemplary process for assigning scores to topics in accordance with the present invention.

DETAILED DESCRIPTION OF THE DRAWINGS

Figure 1:
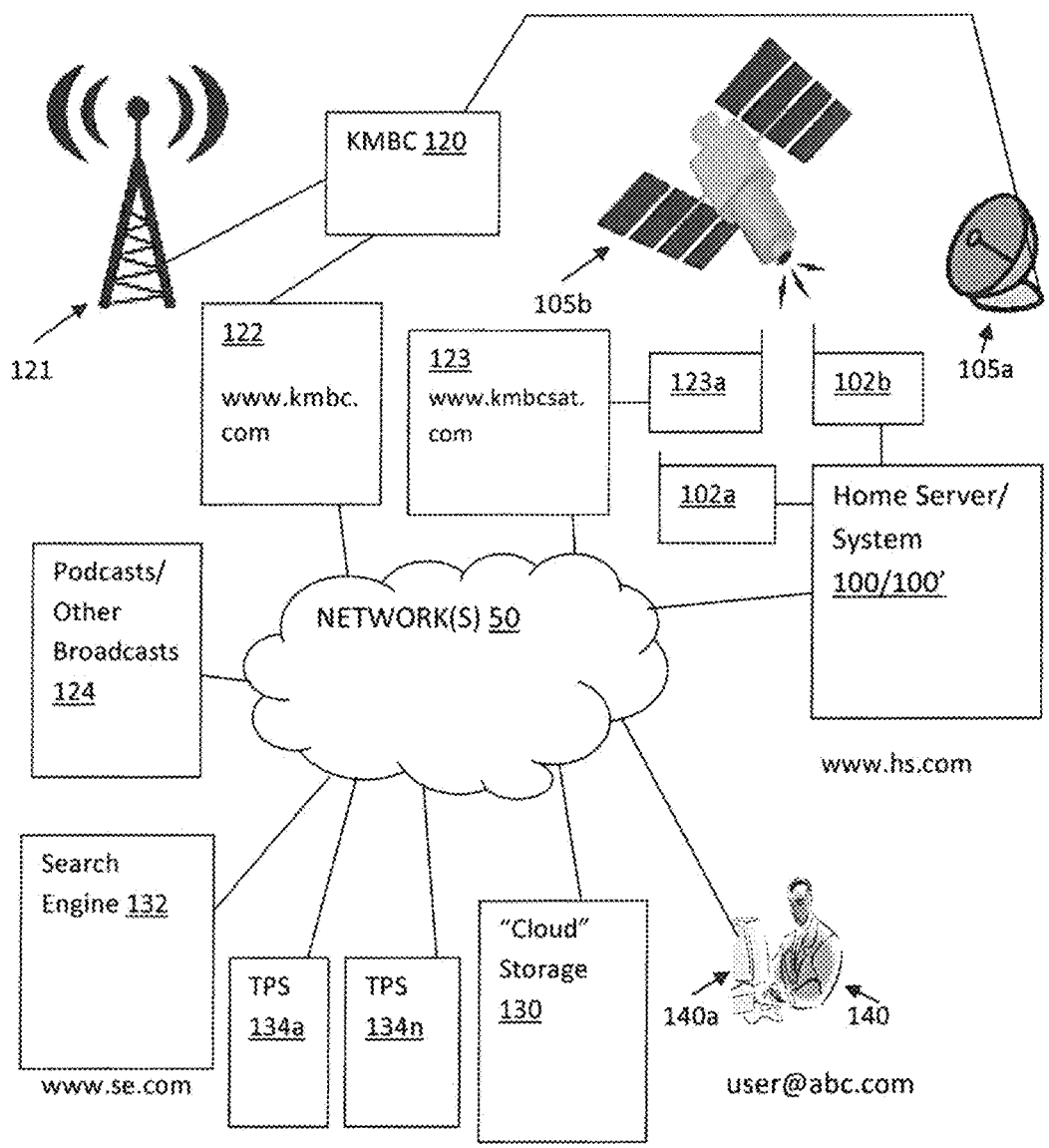
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

Reference is now made to FIG. 1, which shows an exemplary operating environment, including a network 50, to which is linked a home server (HS) 100, also known as a main server. The home server 100 also defines a system 100', either alone or with other, computers, including servers, components, and applications, e.g., client applications, associated with either the home server 100, as detailed below. The network 50 is, for example, a communications network, such as a Local Area Network (LAN), or a Wide Area Network (WAN), including public networks such as the Internet. As shown in FIG. 1, the network 50 is, for example, the Internet. The network 50, although shown as a single network, may be a combination of networks and/or multiple networks including, for example, cellular networks. "Linked" as used herein includes both wired or wireless links, either direct or indirect, and placing the computers, including, servers, components and the like, in electronic and/or data communications with each other.

The home server 100 and its system 100' perform the various processes in accordance with the present invention. One such process involves obtaining the audio broadcasts, and segmenting (separating) the broadcasts into "segments", i.e., audio segments, in accordance with the processes of the present invention. These segments are tagged and stored in various storage media, and accessible via search engines and other computerized searching tools, for example, over networks 50, such as the Internet.

Initially, the home server 100 is designed to receive audio broadcasts, for example, from a radio station 120 (KMBC), that transmits over a the radio tower 121, via a server 122. The audio broadcasts may enter the home server 100 and system 100', either over the network 50, via a server 122, representative of radio stations broadcasting over networks such as the Internet. Alternatively, via a receiver 102a or a server 102b (which includes a receiver 102b'), and via satellite systems 105a and their satellites 105b, such as those associated with satellite radio broadcasters, for example SiriusXM® satellite radio.

The home server 100 may receive the audio broadcasts, through the network 50, e.g., the Internet, from servers 122, 123 (satellite receiver 123a), or via receivers 102a (radio), 102b (satellite). Alternatively, broadcasts, such as Webcasts (live or recorded) and those of "podcasts", stored, for example, on servers 124, may also be obtained by the home server 100, and processed and stored in accordance with the present invention.

Multitudes of other servers are also possible along the network 50. For example, server 130 represents storage for the home server 100, such as cloud storage. Also, server 132 representative of search engines, with a URL, www.se.com, may be used to access the stored content, as provided by the system 100'. Servers 134a to 134n represent servers of third parties (Third Party Server (TPS)), typically not associated with the home server 100, which host web sites and/or provide electronic media from which topic analysis, such as that shown in FIG. 4 and detailed below, is performed.

Users who seek the content provided by the system 100' of the invention, are represented by the user 140, user@abc.com, who links to the network 50 via his computer 140a, either by wired links, WiFi®, or combinations thereof. The user computer 140 can be a standard desktop computer, workstation or the like, laptop, tablet (e.g., iPad® from Apple), smart phone, or the like, which, for example, runs a web browsing application, such as Chrome®, Internet Explorer®, FireFox®, Edge®, or a voice operated device such as Amazon® Echo™.

The home server (HS) 100 is of an architecture that includes one or more components, engines, modules and the like, for providing numerous additional server functions and operations. The home server (HS) 100 may be associated with additional storage, memory, caches and databases, both internal and external thereto. For explanation purposes, the home server (HS) 100 may have a uniform resource locator (URL) of, for example, www.hs.com. While a single home server (HS) 100 is shown, the home server (HS) 100 may be formed of multiple servers and/or components.

Figure 2:
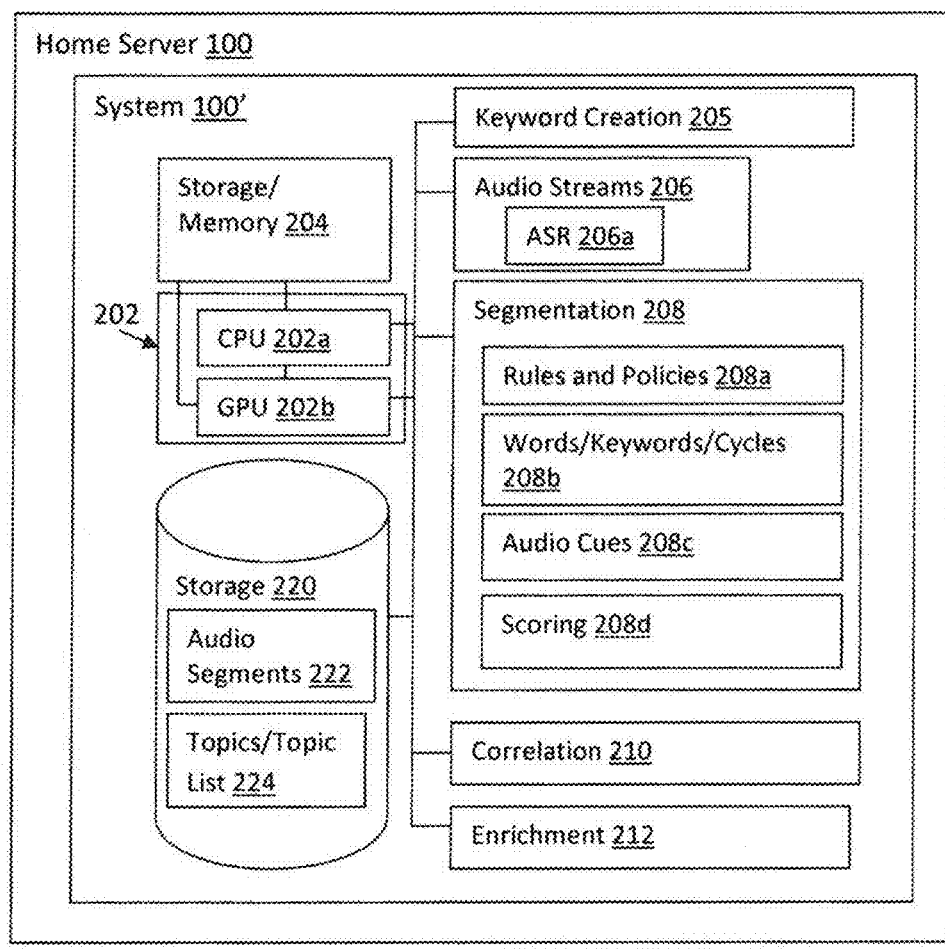
FIG. 2 is a diagram of the architecture of the home server of FIG. 1 and the system thereof.

Attention is now directed to FIG. 2, which shows the architecture of the system 100', for example, in the home server 100. This architecture of the system 100', as shown, for example, in the home server 100, includes a computerized processing unit 202, formed of a central processing unit (CPU) 202a and/or a graphical processing unit (GPU) 202b, each formed of one or more processors. The computerized processing unit 202, is such that the CPU 202a and/or GPU 202b are, for example, electronically connected, including in electronic and/or data communication with each other, as well as with the storage/memory 204, a keyword creation module 205, an audio stream module 206, a segmentation module 208, a correlation module 210, an enrichment module 212, and internal storage media 220, for storing the segments, created by modules 206, 208, 210, 212, in a format accessible by various search engines.

The Central Processing Unit (CPU) 202a and/or the graphical processing unit (GPU) 202b is formed of one or more processors, including microprocessors, for performing the home server 100 functions and operations detailed herein, including controlling the modules 205, 206, 208, 210, 212, and storage media 220.

The Central Processing Unit (CPU) 202a processors are, for example, conventional processors, such as those used in servers, computers, and other computerized devices. For example, the processors may include x86 Processors from AMD and Intel, Xenon® and Pentium® processors from Intel, as well as any combinations thereof.

The graphics processing unit (GPU) 202b, allows for parallel computing with the CPU 202a, such that the computerized processing unit 202 is functional with either or both the CPU 202a and GPU 202b executing. An example GPU 202b includes GPU chips/chipsets from NVIDIA of Santa Clara, Calif.

The storage/memory 204, is associated with the CPU 202a, and/or the CPU 202b is any conventional storage media. The storage/memory 204 stores machine executable instructions associated with the operation of the components, including modules 205, 206, 208, 210, 212 and storage media 220, and all instructions for executing the processes of FIG. 3, detailed herein. The storage/memory 204 also, for example, stores rules and policies for the system 100' and the home server 100. The processors of the CPU 202 and the storage/memory 204, although shown as a single component for representative purposes, may be multiple components, and may be outside of the home server 100 and/or the system 100', and linked to the network 50.

Figure 3A:
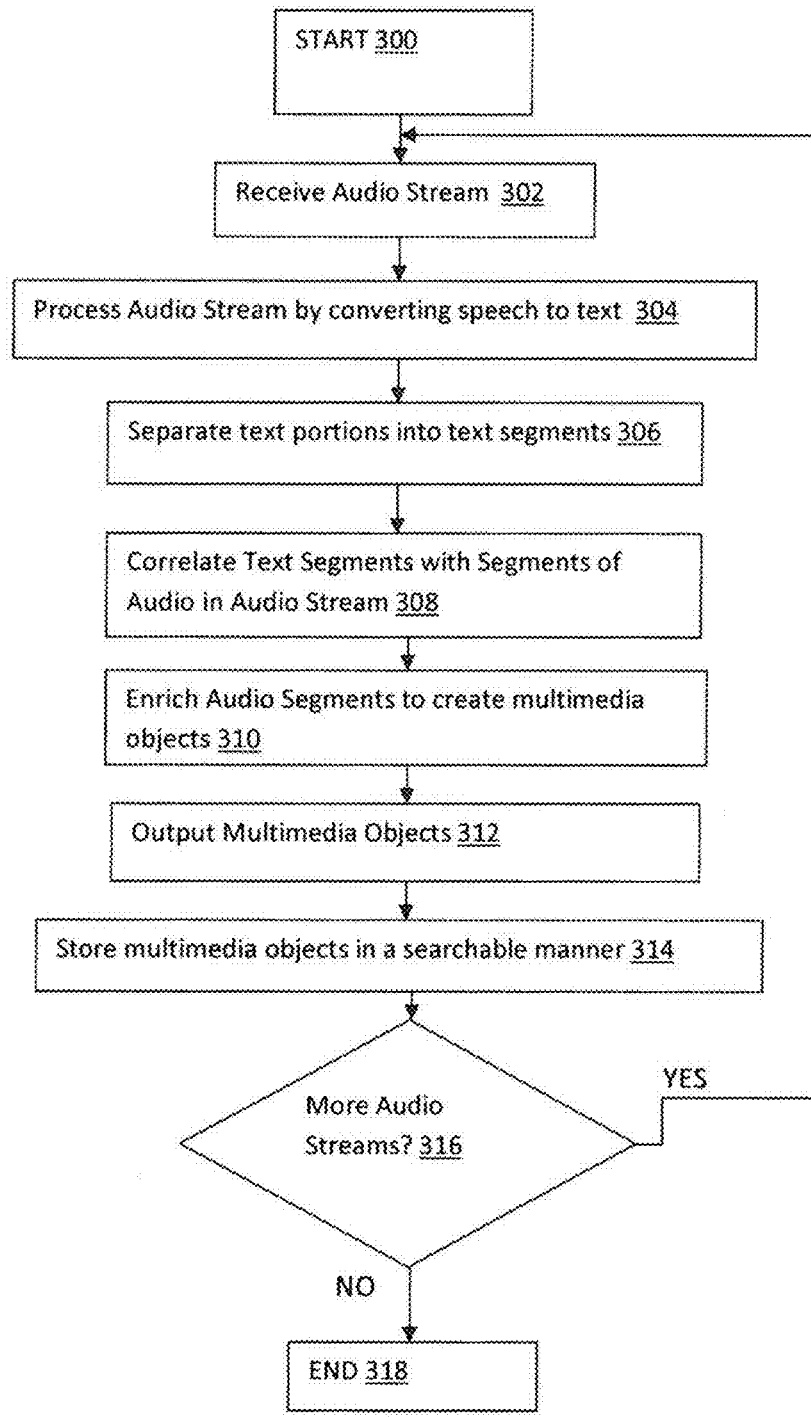
FIG. 3A is a flow diagram of an example process in accordance with embodiments of the present invention.
Figure 3B:
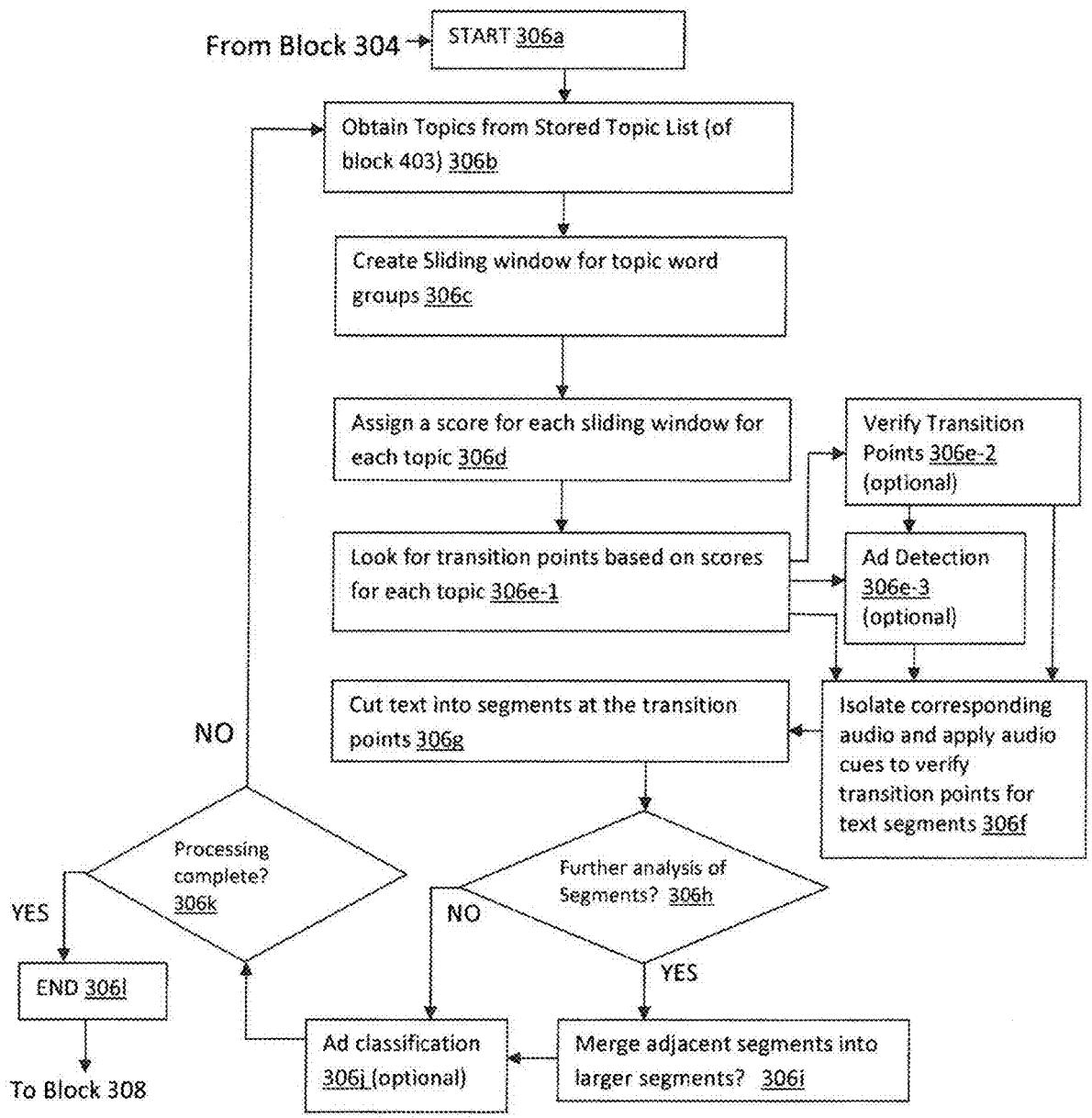
FIG. 3B is a flow diagram of an exemplary segmentation process of the process of FIG. 3A.
Figures 1, 2, 3C:
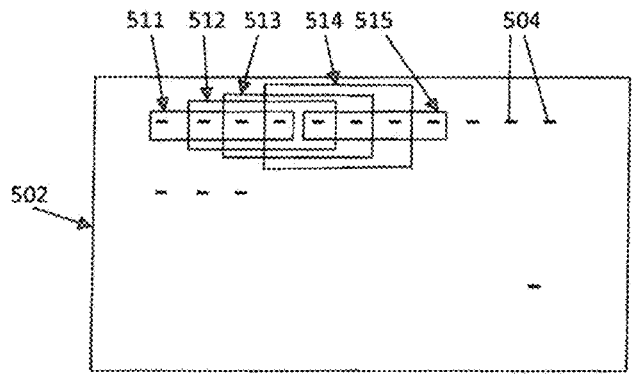
Figures 3, 3C, 4:
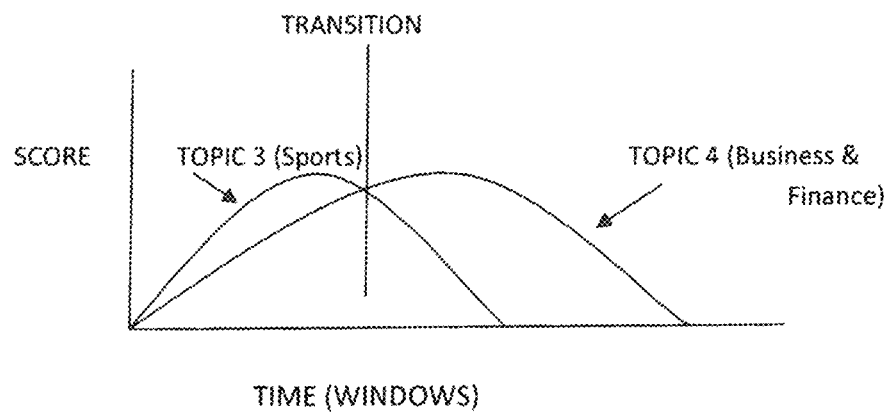
Figures 3, 3C, 4, 5:
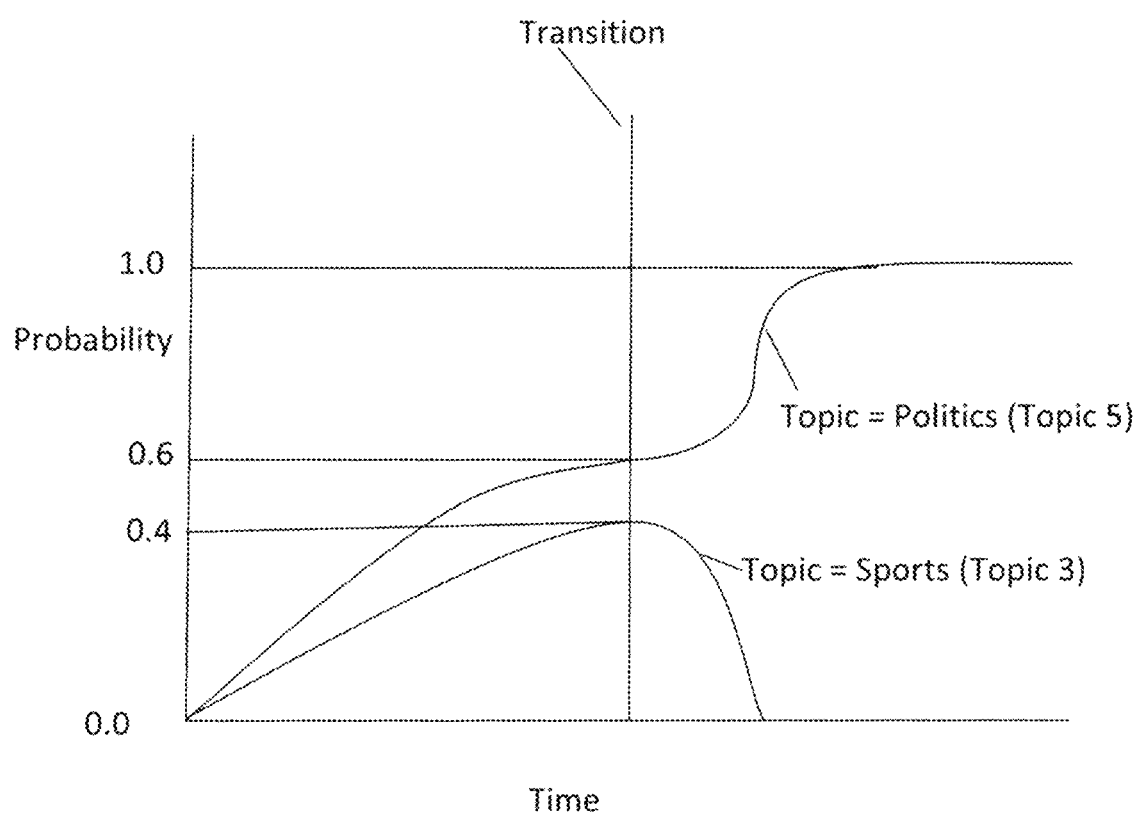
Figures 3, 3C, 4, 5, 6, 7:
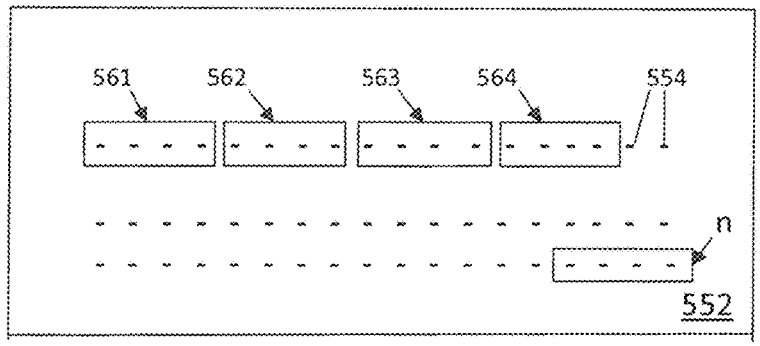
Figure 4:
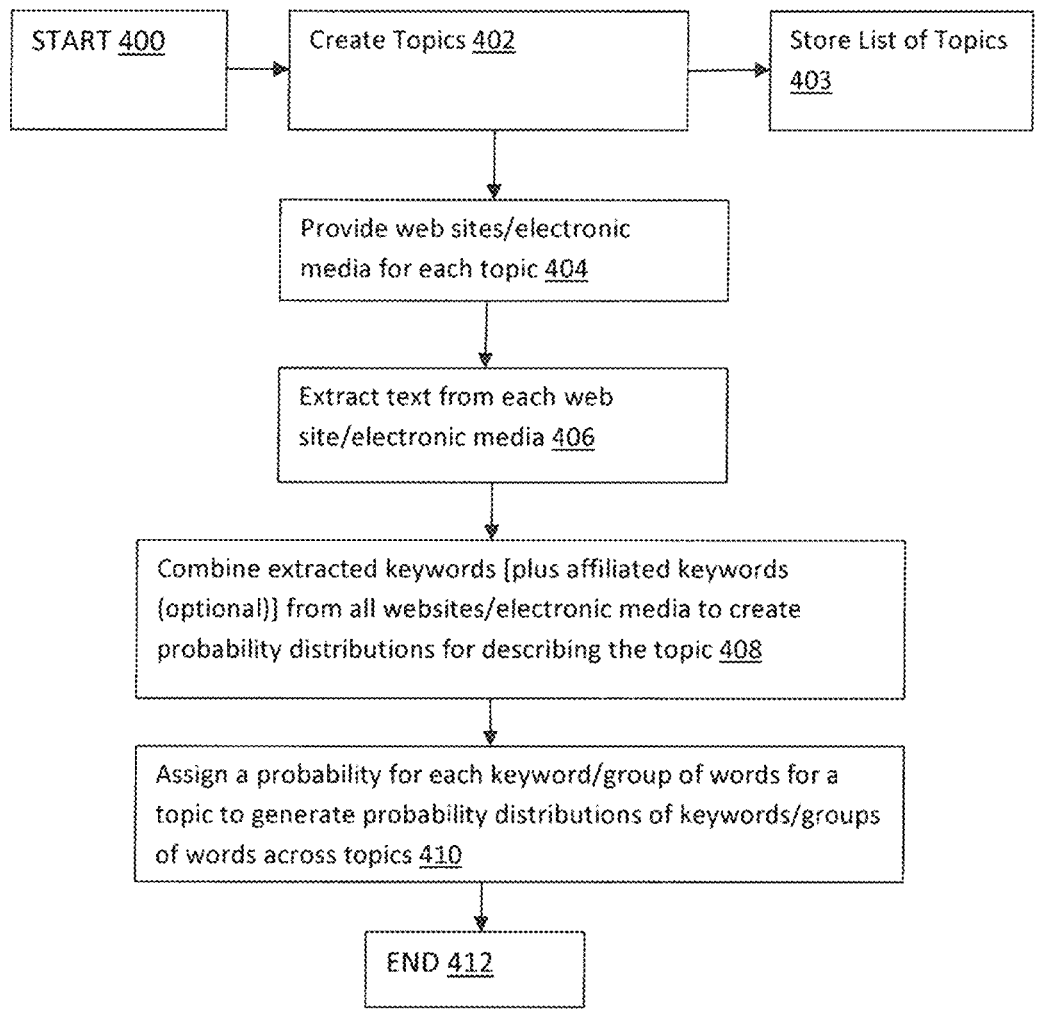

The keyword creation module 205 functions to generate the topics and words, word groups, phrases and the like and their assigned scores, with respect to various topics in the process described, for example, in FIG. 4. While this process is performed separately from the segmentation process, by the module 208, the created topic lists, keywords, affiliated keywords, and scores, including similarity scores, are stored in module 224 and used in the segmentation process.

The audio streams module 206 includes software and/or hardware for instructing the GPU 202*b*, and typically also the CPU 202*a*, to select, handle and convert the audio streams, which have been obtained from the various broadcasts, for example, radio, satellite radio, internet broadcasts, podcasts, television, cable, network streams, into a format suitable for operation on by the segmentation module. This occurs, for example in real time. This module 206 includes an Automatic Speech Recognition (ASR) module 206*a*, which executes, for example on the GPU 202*b*, and which includes speech to text converters (STT), so that the text (from the obtained speech) can be analyzed in order to create the audio segments in accordance with the invention.

The segmentation module 208 analyzes the processed audio stream, which is the output of module 206, and creates segments of the audio stream. Segmentation of the audio stream is, for example, performed by analyzing the text, from the speech to text converter 206*a*, based on indicators of segmentation (segmentation indicators), for example, rules and policies 208*a*, keywords or other word markers 208*b*, audio cues 208*c* and scores from a scoring 208*d* submodule. The scoring submodule 208, provides scores, such as those for the relatedness of words (based on their meaning), including, for example, window scores, for both sliding and successive windows (and similarity scores for successive windows), probabilities, and the like.

The outputted segments from the segmentation module 208 are input into a correlation module 210. This module 210 functions to correlate the segments from the text, with the corresponding audio portions (segments) in the audio stream.

The audio stream segments (audio segments) are processed by the enrichment module 212. This processing includes associating metadata, tags, images, indexing items, such as terms, phrases and the like, of words, characters, symbols and combinations thereof, and the like, with each audio stream segment (audio segment). For example, a sports audio segment where a reporter interviewed Eric Hosmer after the Kansas City Royals Won the 2015 World Series may include metadata: Sports, Baseball, World Series, World Series 2015, Kansas City Royals, Eric Hosmer, Interview with Eric Hosmer, www.kmbc.com, Kansas City, US Midwest, Missouri, a photograph of Eric Hosmer, a graphic of the Kansas City Royals logo.

From the enrichment module 212, the audio segments 222 with their metadata and/or tags are stored in the storage media 220. In the storage media 220, the storage is such that the audio segments are searchable (electronically) and accessible by conventional search engines and other computerized processes, computers and the like. The storage media 220, for example, also includes topics, arranged, for example, as a list of topics 224. Both the audio segments and/or their metadata and the topics/list of topics is also storable in the cloud storage 130, due to the potentially large data volume. For example, the storage media 220 can be arranged such that only metadata is stored therein, with the actual audio segments and topic lists stored in the cloud storage 130.

Attention is now directed to FIGS. 3A, 3B and 4, which show flow diagrams detailing computer-implemented processes in accordance with embodiments of the disclosed subject matter. Reference is also made to elements shown in FIGS. 1 and 2. The process and subprocesses of FIGS. 3A, 3B and 4, include computerized processes performed by the system 100'. The aforementioned processes and sub-processes can be, for example, performed manually, automatically, or a combination thereof, and, for example, in real time. Reference is also made to the diagrams of FIGS. 3C-1, 3C-2 and 3C-3, which are used in describing the process of FIG. 3B, as detailed below, and the diagram of FIG. 3C-4, used in describing another process of FIG. 3B.

The process of FIG. 3A begins at the START block 300. At this block, media content, typically media stream(s) in digital or analog format (as digital or analog data), for example, broadcast audio streams are accessible by the system 100'. The media streams include content (e.g., audio content of audio streams), which includes, for example, topics, advertisements, public service announcements, as well as differentiated segments within the topics (e.g., in-topic segments, for example, when the topic of "sports" includes in-topic segments of "baseball" and "football"), advertisements, public service announcements, themselves.

The process moves to block 302, where the system 100' receives the audio stream as input, in the audio streams module 206, for example, in real time. The process moves to block 304, where the audio stream is processed, as it is typically converted into text, by the Speech To Text functionality of the Automatic Speech Recognition module 206*a*, or any other suitable speech to text conversion program, for example, CMU Sphinx, an open source speech recognition tool kit, from Carnegie Mellon University, Pittsburgh, Pa.

The process moves to block 306, where the audio stream, now converted into text and audio cues by the speech to text conversion (of block 304), is separated into text segments. This sub process is known as "segmentation". The segmentation module 208 applies rules and policies to the text, as well as searches for keywords and analyzes them. This is done in order to look for a consistent pattern of words relevant to a topic, which would make up a segment. For example, if in a one minute period, most of the words are associated with baseball, the topic would be baseball, until another series of different words comes along. For example, keywords in order in an audio stream may be, "sports, baseball, Kansas City Royals, World Series, champions, 2015, interview, Eric Hosmer, first base, gold glove, home run, game winner, final out, banking, stocks, interest rate, federal reserve, . . . , movies, drama, theatre, best actress . . . ." Once the sequence left "final out" and moved to "banking, stocks, interest rate", the sequence changes from the topics "Sports" to "Business". Accordingly, the sports sequence is separated from the audio stream as a segment, as the change in words (dissimilarity in the meaning of the words, or the relatedness of the words to each other based on their definitions and meaning) is an indicator of segmentation (segmentation indicator) or transition ("segmentation" and "transition" used interchangeably herein) between topics, indicative of a change of topics. Similarly, the business sequence is separated from the audio stream as a segment, once the words "movies, drama, theatre" begin. Hence, the business segment is that between the words "final out" and "movies", or between the "sports" and "entertainment" topic segments. In addition and in cases where words may not be automatically associated with a topic, techniques like machine learning and Natural Language Processing (NLP) may be used, so that words are associated with various topics.

The segmentation module 208 also looks for indicators of segmentation (segmentation indicator) or transition, such as audio cues, for example, as stored in the audio cues module 208c, to determine segment breaks, transitions, separations, and the like. These audio cues include any information obtained from the audio stream which is not textual, for example, silence, music, commercials, vocal changes from person to person, or speech to song, and vice versa, various sounds including sounders, and the like.

The segments in text format, are then correlated with their location in the audio stream, at block 308, by the correlation module 210, such that audio segments, corresponding to the text segments are created. The process moves to block 310, where the audio segments are enriched with metadata, tags, images, video, and the like, by the enrichment module 212, so the audio segments can be indexed and/or stored, for example, as searchable segments or portions, such as computer searchable segments or portions, so as to be searchable, by search engines, computers and the like. The now enriched audio segments are known as multimedia objects or "bursts". Multimedia objects include web consumed content with visual and audio portions, and also includes one or more of text, titles, tags and categories. By "consumed", the multimedia objects can be shared, searched embedded, or otherwise made available over the world wide web (WNW). The multimedia objects are the output of block 312, and are then stored in storage media 220, at block 314.

The process moves to block 316, where the processor 202 determines whether there are more audio streams to be processed. If yes, the process returns to block 302, from where it resumes. If no, the process moves to block 318, where it ends.

Turning back to block 306, an exemplary segmentation process, in detail, is explained, and shown in FIGS. 3B, 3C-1, 3C-2 and 3C-3, and to which attention is now directed. The process begins at the START block 306a, from block 304. For example, at the START block 306a, the system 100' has analyzed the audio cues, and has determined the probable end of a segment, for example, having recognized audio cues including one or more of long silences, music, volume or speed change of the audio.

The process moves to block 306b, where topics are obtained from the topic lists, stored in the storage 220 or in the cloud server(s) 130 (for example, the topic lists may correspond to metadata in the storage 220). The topic lists are, for example, from the lists created by module 205 in the process described and shown in FIG. 4, detailed below. Moving to block 306c, a sliding window is created for topic word groups. As shown in FIG. 3C-1, the text 502 includes words, represented by dashes 504. The words 504 are placed into a sliding window, for example windows 511-515, which ultimately cover the entire text 502. The sliding window is, for example, of a predetermined length, and the sliding distance is also of a predetermined length. For example, the sliding window 511-515 is of a length of four words, with a sliding distance of one word. The windows 511-515 are shown reverse telescopically to indicate the "sliding", in the direction from window 511 to window 515. However, any desired length for the sliding window is permissible, depending on the text which needs to be analyzed.

The process moves to block 306d, where a score is assigned for each sliding window, e.g., 511 (window 1) to 515 (window 5), as shown in FIG. 3C-2. The basis for the score is obtained, for example, from module 205 (FIG. 4). For example, with "0" being a low score, and "3" being the highest or maximum score, a window including the words, "Kansas City Royals" typically have a maximum score of "3" in the topics of "Sports", "Baseball", "World Series", while a window with the words, "Federal Reserve", "mortgage rates are rising", "Janet Yellen", typically have a maximum score of "3" for the topics of "Business" and "Finance".

In an additional or alternate process, affiliated keywords may be used in determining the score. For example, it is probable that the term "Janet Yellen" will have a high score, for example, the value "3", the maximum score, under the "business" topic, while the word "interest" will have a score of "0" in the business topic, since it is a very general word with multiple definitions. However, if the word "interest" appears within the same text window (see, for example the windows 511-515 of FIG. 3C-1) as "Janet Yellen", the word "interest" will receive the score of "1", since "interest" can be interest rate, rendering "interest" an "affiliate" of "Janet Yellen" (Janet Yellen is in charge of the organization which sets interest rates). In addition, affiliated keywords may be used to differentiate in-topic segments. This occurs typically in the case where topic segments are too long. For example, a transition point is placed between a window with the words "Federal Reserve" and "Janet Yellen", which are affiliated, and with the words "IRS" and "tax refunds", which are affiliated, even though both word pairs (Federal Reserve and Janet Yellen) and (IRS and tax refunds) belong to the topic "business".

The process moves to block 306e-1, where the scores, e.g., the scores of the table of FIG. 3C-2, are graphically represented in FIG. 3C-3, and the graphs of the scores are analyzed for transition points. The transition point between Topic 3 (Sports) and Topic 4 (Business & Finance) is isolated in FIG. 3C-3. Optionally, as shown in FIG. 3C-4, the scores are treated as a probability distribution over the topics list, allowing each window of text to be associated with hybrid topics, formed of multiple topics. In this case the transition point will be calculated using a measure of distance between probability distributions, such as Jensen-Shannon distances.

For example, a text passage may contain "Obama", a reference to President Barack Obama. "Obama" would receive a score of "3" in the topic "politics" (Topic 5). However, in the first portion of the passage, President Obama is discussing that he "enjoys playing tennis on the new tennis courts at the White House". The term "tennis" receives a score of "2" in the topic "sports" (Topic 3). Accordingly, the probabilities (p) for this first portion of the passage, where the total probability p2 is 1.0 (representing 100 percent), as shown in FIG. 3C-5, are expressed as follows:

$$p2=0.6p(\text{politics})+0.4p(\text{sports})$$

In the next portion of the passage, the conversation moves to President Obama talking about the Democratic Party and elections. Now the probabilities (p) for this second portion of the passage, where the total probability p3 is 1.0 (representing 100 percent), as shown in FIG. 3C-5, are expressed as follows:

$$p3=1.0p(\text{politics})+0.0p(\text{sports})$$

While "politics" is the dominant topic of the passage, assigning topic probabilities allows for the addition of a transition point in the corresponding text of the passage, for example, as shown in FIG. 3C-5.

The process moves to block 306e-2, where the optional process of verifying the transition points may be performed. This process involves examining the similarity of neighboring text windows using Natural Language Processing (NLP) methods, for example, such as those detailed in Choi, F. Y. Y., "Advances in Domain Independent Linear Text Segmentation," in, *Proceedings of the 1st North American Chapter of the Association for Computational Linguistics Conference*, Pages 26-33, (2000), Seattle, Wash., USA, the disclosure of which is incorporated by reference herein. In this process the text 552 is cut into equal length successive windows 561-564 of words 554, as shown in FIG. 3C-6. The text similarity scores (for example, between 1, for low similarity, and 5, for high similarity) between each pair of such windows are computed, and saved according to their position in the text, as shown, for example, in FIG. 3C-7. Adjacent windows, such as window 561 and 562 of FIG. 3C-6, with a similarity score of "5", as determined by similarity score algorithms of the system 100' (in scores module 208d), which belong to the same segment, are likely to be similar. It thus follows that the similarity scores of the windows should remain high along a segment, and between the text windows 561-564 it contains. When the score drops, such as between window 2 562 and window 3 563 (for example, from a score of "5" to a score of "1", as shown in the Table of FIG. 3C-7), this is probably a transition point between the segments.

The process can move to block 306e-3, an optional process, where ads (advertisements), or other information items (e.g., public service announcements and the like), and other known break points are detected. This detection process is also performable, for example, by machine learning techniques for classification, including artificial intelligence (AI) software, such as a logistic regression classifier or a neural network. The process can also go directly from block 308e-1, if desired.

From block 306e-1, and one or both of blocks 306e-2 and 306e-3, the process moves to block 306f, where the audio corresponding to the requisite text segments is isolated and audio cues are used to determine transition (e.g., separation or segmentation) points for the text segments. The transition points are verified to be the transition points where the text is to be separated.

The process moves to block 306g, where the text is cut (separated) into segments at the designated (and verified) transition points.

Alternately, the processes of blocks 306f and 306g may be performed as a single process.

The process now moves to block 306h, where the system 100' determines whether further processing, e.g., further analysis of the separation points for the text segments is needed. If yes, at block 306h, the process moves to block 306i, further analysis of the text segments is necessary and the an optional process of merging adjacent segments into larger segments is performed. This process involves examining the similarity of neighboring segments using Natural Language Processing (NLP) methods, for example, those detailed in, Choi, F. Y. Y., "Advances in Domain Independent Linear Text Segmentation," in, *Proceedings of the 1st North American Chapter of the Association for Computational Linguistics Conference*, Pages 26-33, (2000), Seattle, Wash., USA, the disclosure of which is incorporated by reference herein. Neighboring segments may be merged together based on these similarity scores and considering also segment size. From block 306i, the process moves to block 306j.

Returning to block 306h, if no, at block 306h, the process moves to block 306j.

At block 306j, the optional process of ad (or other information item) classification is performed. This process is performed, for example, using machine learning techniques for classification. Artificial intelligence (AI) software, such as a logistic regression classifier or a neural network is input (fed) with text examples taken from advertisements (ads) and other information items. Another set of text examples is taken from content segments. After enough examples have been fed into the classifier, the classifier can label a text window as to whether or not it belongs to an ad (or other information item).

From block 306j, the process moves to block 306k, where the system 100' determines whether the processing is complete, where there is more text to process. Should there be more text to process, the process moves from block 306k to block 306b, from where the process resumes. Should processing of text be complete, the process moves to block 306l, where it ends, and the process resumes from block 308.

Turning now to FIG. 4, the topics and words, word groups, phrases and the like are assigned scores with respect to various topics. The process is a separate process from those of FIGS. 3A and 3B, with the scores from this process used in the processes of FIGS. 3A and 3B, as detailed above.

The process begins at the START block 400. This process is, for example, run regularly, at regular intervals, such as hourly or daily, but can also be run at random intervals. The process moves to block 402 where topics are created, by being selected, typically manually, but may be done automatically. The topics are stored, for example, as topic lists 224 in the storage media 220, at block 403. Moving from block 402 to block 404, web sites or other electronic media are provided for each topic, for example, the web sites and/or electronic media are hosted, for example, by servers 134a-134n. One or more of these web sites and/or electronic media, hosted by the servers 134a-134n, corresponds to one of the selected topics.

The process moves to block 406, where text is extracted from the web site/electronic media. Moving to block 408, words, word groups, and phrases, typically referred to as "keywords", are extracted from the text of the web pages/electronic media, for each topic, which have higher occurrences than other words, word groups, phrases, and are common across all web pages/electronic media for each topic. Keywords which are common to a topic but not to other topics are preferred here. These extracted words, word groups, phrases, are then utilized to create the probability distributions for describing the respective topics.

Alternately, affiliated (interchangeable with "affiliate") keywords may be used with, or instead of, the extracted keywords may be used for greater accuracy. These affiliated keywords are also, for example, extracted keywords, or added from a database of affiliated keywords, which are typically used with the initially extracted keyword(s).

The process of generating the affiliated keywords and obtaining information about "affiliated keywords", i.e. keywords which in the current sources are highly likely to appear together, is an optional process. The affiliated keywords and information about these affiliated keywords allows the segmentation process to separate adjacent bursts of the same topic. For example the transcript of entertainment news may include text containing the initially extracted keyword "Brad Pitt" and affiliate it with "Angelina Jolie" so as to create the affiliated keywords "Brad Pitt" and "Angelina Jolie", which is used as the keyword. Similarly, the keywords "Carrie Fisher" and "Debbie Reynolds" may be used as affiliate keywords, based on the initial keyword "Carrie Fisher".

The process moves to block 410, where a probability is assigned to each keyword/group of words/phrase for a topic to generate probability distributions of keywords/group of words/phrases across topics, which appeared prominently with each topic. These assignments are performed by the scoring module 208d. For example, David Glass is the owner of the Kansas City Royals and former CEO of Wal-Mart. Accordingly, "David Glass" may have a high probability for the topics of "Sports", "Baseball", "World Series", which ultimately translates to a maximum score of "3" as per the Table of FIG. 3C-2, a medium probability for the topics "Business" and "Finance", translating to a score of "2" as per the Table of FIG. 3C-2, and a low probability in the topic "Entertainment", translating to a score of "1" or "0" as per the Table of FIG. 3C-2.

From block 410, the process moves to block 412, where it ends.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computer-implemented method for providing a plurality of audio segments of audio content, comprising:
    converting the audio content to text;
    analyzing the text to calculate for each of a plurality of time intervals of the audio content a plurality of scores each defining a relentless of at least one of words and phrases in the respective time interval to one of a plurality of topics;
    calculating a plurality of transition points between a plurality of text segments of the text, each of the plurality of transition points is calculated according to a distribution of at least two of the respective scores given for at least two different topics from the plurality of topics in successive time intervals of the plurality of time intervals;
    identifying in the text a plurality of text segments according a temporal location of at least two transition points from the plurality of transition points;
    correlating each of the plurality of text segments with a corresponding audio segment from the plurality of audio segments of the audio content;
    associating each of the plurality of audio segments separately from other of the plurality of audio segments of the audio content;
    with enriching data comprising at least one of metadata, a tag, an image, and an indexing item, the enriching data is set according to the respective correlated text segment; and
    retrieving an audio segment from the plurality of audio segments in response to a query from at least one search engine based on the respective enriching data.

2. The computer-implemented method of claim 1, performed automatically by at least one processor.

3. The computer-implemented method of claim 1, wherein at least one of the plurality of transition points is further calculated according to at least one of: rules and policies, changes in relatedness of the words and phrases in the successive time interval, keywords, word markers, and audio cues.

4. The computer-implemented method of claim 1, wherein said each audio segment includes audio content based on at least one of topics, advertisements, and public service announcements.

5. The computer-implemented method of claim 1, wherein the audio content is from a broadcast.

6. The computer-implemented method of claim 5, wherein the broadcast is selected from the group consisting of a radio broadcast, a television broadcast, a cable broadcast, a webcast, a podcast, and a network carried broadcast.

7. The computer-implemented method of claim 1, wherein the converting the audio content to text is performed by at least one of automatic speech recognition software, hardware or combinations thereof.

8. The computer-implemented method of claim 1, where the enrichment includes associating metadata, tags, images, and indexing items with said each audio segment.

9. A system for providing a plurality of audio segments of an audio content comprising:
    a computerized processing unit; and,
    storage media for storing computer components for in communication with the computerized processing unit, the computer components comprising:
    a component for converting the audio content to text;
    a component for analyzing the text to calculate for each of a plurality of time intervals of the audio content a plurality of scores each defining a relentless of at least one of words and phrases in the respective time interval to one of a plurality of topics;
    a component for calculating a plurality of transition points between a plurality of text segments of the text, each of the plurality of transition points is calculated according to a distribution of at least two of the respective scores given for at least two different topics from the plurality of topics in successive time intervals of the plurality of time intervals;

a component for automatically identifying in the text a plurality of segments according a temporal location of at least two transition points from the plurality of transition points;

a component for correlating of the plurality of text segments with a corresponding audio segment from the plurality of audio segments of from the audio content;

a component for associating each of the plurality of audio segments separately from other of the plurality of audio segments of the audio content with enriching data comprising at least one of metadata, a tag, an image, and an indexing item, the enriching data is set according to the respective correlated text segment;

a component for retrieving an audio segment from the plurality of audio segments in response to a query from at least one search engine based on the respective enriching data.

10. The system of claim 9, further comprising a component for obtaining the audio content from a broadcast, the broadcast selected from the group consisting of a radio broadcast, a television broadcast, a podcast, a network carried broadcast.

11. The system of claim 9, wherein the plurality of topics are selected by analyzing electronic documents including web pages.

12. The system of claim 9, wherein the computerized processing unit includes a central processing unit and a graphics processing unit.

13. The system of claim 9, further comprising the audio content is converted to text by an automatic speech recognition (ASR) module which executes on a graphics processing unit.

14. A system for providing a plurality of audio segments of audio content comprising:

a computerized processing unit, programmed to:

analyze a text output to calculate for each of a plurality of time intervals of the audio content a plurality of scores each defining a relentless of at least one of words and phrases in the respective time interval to one of a plurality of topics;

calculate a plurality of transition points between a plurality of text segments of the text, each of the plurality of transition points is calculated according to a distribution of at least two of the respective scores given for at least two different topics from the plurality of topics in successive time intervals of the plurality of time intervals;

identify in the text a plurality of text segments according a temporal location of at least two transition points from the plurality of transition points;

correlate each of the plurality of text segments with a corresponding audio segment from the plurality of audio segments; and store each of the plurality of audio segments as a separate searchable audio segment in storage media, and, in a format accessible by at least one search engine, each of the plurality of audio segments is associated separately with enriching data comprising at least one of metadata, a tag, an image, and an indexing item according to the respective text segment;

a converter for converting a speech of the audio content into the text output, the converter in communication with the computerized processing unit.

15. The system of claim 14, wherein the converter includes an automatic speech recognition (ASR) module.

16. The system of claim 15, wherein the computerized processing unit includes a central processing unit and a graphics processing unit and the ASR module executes on the graphics processing unit.

17. The system of claim 14, wherein the segments of text output and the corresponding audio segments are content based.

18. The system of claim 15, wherein the computerized processing unit programmed to enrich each audio segment enriches said each audio segment by associating at least one of metadata, tags, images, and indexing items, with said each audio segment.

* * * * *